(12) United States Patent
Inoue et al.

(10) Patent No.: US 12,461,332 B2
(45) Date of Patent: Nov. 4, 2025

(54) PROJECTION APPARATUS, PROJECTION METHOD, AND CONTROL PROGRAM

(71) Applicant: FUJIFILM CORPORATION, Tokyo (JP)

(72) Inventors: Kazuki Inoue, Saitama (JP); Tomonori Masuda, Saitama (JP); Akihiro Ishizuka, Saitama (JP); Kazuki Ishida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 613 days.

(21) Appl. No.: 17/885,100

(22) Filed: Aug. 10, 2022

(65) Prior Publication Data

US 2022/0382012 A1 Dec. 1, 2022

Related U.S. Application Data

(63) Continuation of application No. PCT/JP2021/003430, filed on Jan. 29, 2021.

(30) Foreign Application Priority Data

Feb. 21, 2020 (JP) .................................. 2020-028504

(51) Int. Cl.
*G02B 7/09* (2021.01)
*G02B 7/14* (2021.01)
*G03B 21/14* (2006.01)

(52) U.S. Cl.
CPC ................ *G02B 7/09* (2013.01); *G02B 7/14* (2013.01); *G03B 21/145* (2013.01)

(58) Field of Classification Search
CPC ........... G02B 7/09; G02B 7/14; G03B 21/145
USPC ........................................................ 359/694
See application file for complete search history.

(56) References Cited

U.S. PATENT DOCUMENTS

| | | |
|---|---|---|
| 2012/0218528 A1 | 8/2012 | Kano |
| 2015/0070664 A1 | 3/2015 | Kano |
| 2018/0033123 A1 | 2/2018 | Narimatsu et al. |
| 2018/0262728 A1 | 9/2018 | Kobayashi, II |
| 2019/0219915 A1 | 7/2019 | Kayano |
| 2021/0250557 A1 | 8/2021 | Shimizu et al. |

FOREIGN PATENT DOCUMENTS

| | | |
|---|---|---|
| JP | 2012-194529 A | 10/2012 |
| JP | 2018-21943 A | 2/2018 |
| JP | 2018-151442 A | 9/2018 |
| JP | 2020-8799 A | 1/2020 |

(Continued)

OTHER PUBLICATIONS

International Preliminary Report on Patentability for International Application No. PCT/JP2021/003430, dated Sep. 14, 2021, with an English translation.

(Continued)

*Primary Examiner* — William Choi
(74) *Attorney, Agent, or Firm* — Birch, Stewart, Kolasch & Birch, LLP

(57) ABSTRACT

A projection apparatus projects an image by an optical system having at least one optical characteristic being variable, and the projection apparatus includes a processor configured to perform a control of regulating a movement of a projection region to which the image is projected, based on the at least one optical characteristic in the optical system.

15 Claims, 9 Drawing Sheets

(56) References Cited

FOREIGN PATENT DOCUMENTS

| JP | 6639619 B1 * | 2/2020 | ............. G02B 7/023 |
| WO | WO 2018/055964 A1 | 3/2018 | |

OTHER PUBLICATIONS

International Search Report for International Application No. PCT/JP2021/003430, dated Apr. 13, 2021, with English translation.
Written Opinion of the International Searching Authority for International Application No. PCT/JP2021/003430, dated Apr. 13, 2021.

* cited by examiner

PROJECTION APPARATUS, PROJECTION METHOD, AND CONTROL PROGRAM

CROSS REFERENCE TO RELATED APPLICATION

This is a continuation of International Application No. PCT/JP2021/003430 filed on Jan. 29, 2021, and claims priority from Japanese Patent Application No. 2020-028504 filed on Feb. 21, 2020, the entire disclosures of which are incorporated herein by reference.

BACKGROUND OF THE INVENTION

1. Field of the Invention

The present invention relates to a projection apparatus, a projection method, and a computer readable medium storing a control program.

2. Description of the Related Art

JP2018-021943A discloses a projector that, in a case of moving (shifting) a position of a lens unit by a lens shift mechanism, avoids or suppresses vignetting caused by a main body and an effect caused by light deviating from an image circle by controlling a position of a lens mount to fall within an appropriate range using lens information in which a lens ID is associated with a lens shift range.

In addition, JP2012-194529A discloses a projection apparatus that, in a case where video light extends from an image circle of a mounted lens, moves the mounted lens to a reference position to bring an optical axis of the mounted lens close to a normal line passing through a center of a liquid crystal panel.

SUMMARY OF THE INVENTION

One embodiment according to the disclosed technology provides a projection apparatus, a projection method, and a computer readable medium storing a control program that suppress a decrease in projection quality of a projection apparatus including an optical system having variable optical characteristics.

A projection apparatus according to an aspect of the present invention is a projection apparatus that projects an image by an optical system having variable optical characteristics, the projection apparatus comprising a processor configured to perform a control of regulating movement of a projection region to which the image is projected, based on the optical characteristics in the optical system.

A projection method according to another aspect of the present invention is a projection method by a projection apparatus that projects an image by an optical system having variable optical characteristics, the projection method comprising performing, by a processor of the projection apparatus, a control of regulating movement of a projection region to which the image is projected, based on the optical characteristics in the optical system.

A control program according to still another aspect of the present invention is a control program of a projection apparatus that projects an image by an optical system having variable optical characteristics, the control program causing a computer to execute a process comprising performing a control of regulating movement of a projection region to which the image is projected, based on the optical characteristics in the optical system.

According to the present invention, a projection apparatus, a projection method, and a control program that can suppress a decrease in projection quality of a projection apparatus including an optical system having variable optical characteristics can be provided.

DESCRIPTION OF THE PREFERRED EMBODIMENTS

In the technology of the related art, in a case where optical characteristics such as an angle of view are variable in an optical system of a projection apparatus, a projection region to which an image is projected by the projection apparatus may be blocked by a body part or the like of the projection apparatus depending on a state of the optical characteristics, and projection quality may be decreased.

For example, while the projection region is not blocked by the body part or the like in a state where an angle of view of a lens of the projection apparatus is set to a telephoto side, setting the angle of view of the lens of the projection apparatus to a wide angle side may cause the projection region to be blocked by the main end part or the like.

In addition, for example, as in JP2018-021943A, in a method of setting a lens shift range for each lens ID, problems as described above in a configuration in which the optical characteristics in one lens are variable cannot be solved. In addition, means for solving problems as described above is also not disclosed in JP2012-194529A.

Hereinafter, an embodiment of the present invention for solving the problems will be described with reference to the drawings.

<Schematic Configuration of Projection Apparatus 10 that is Embodiment of Projection Apparatus According to Present Invention>

Figure 1:
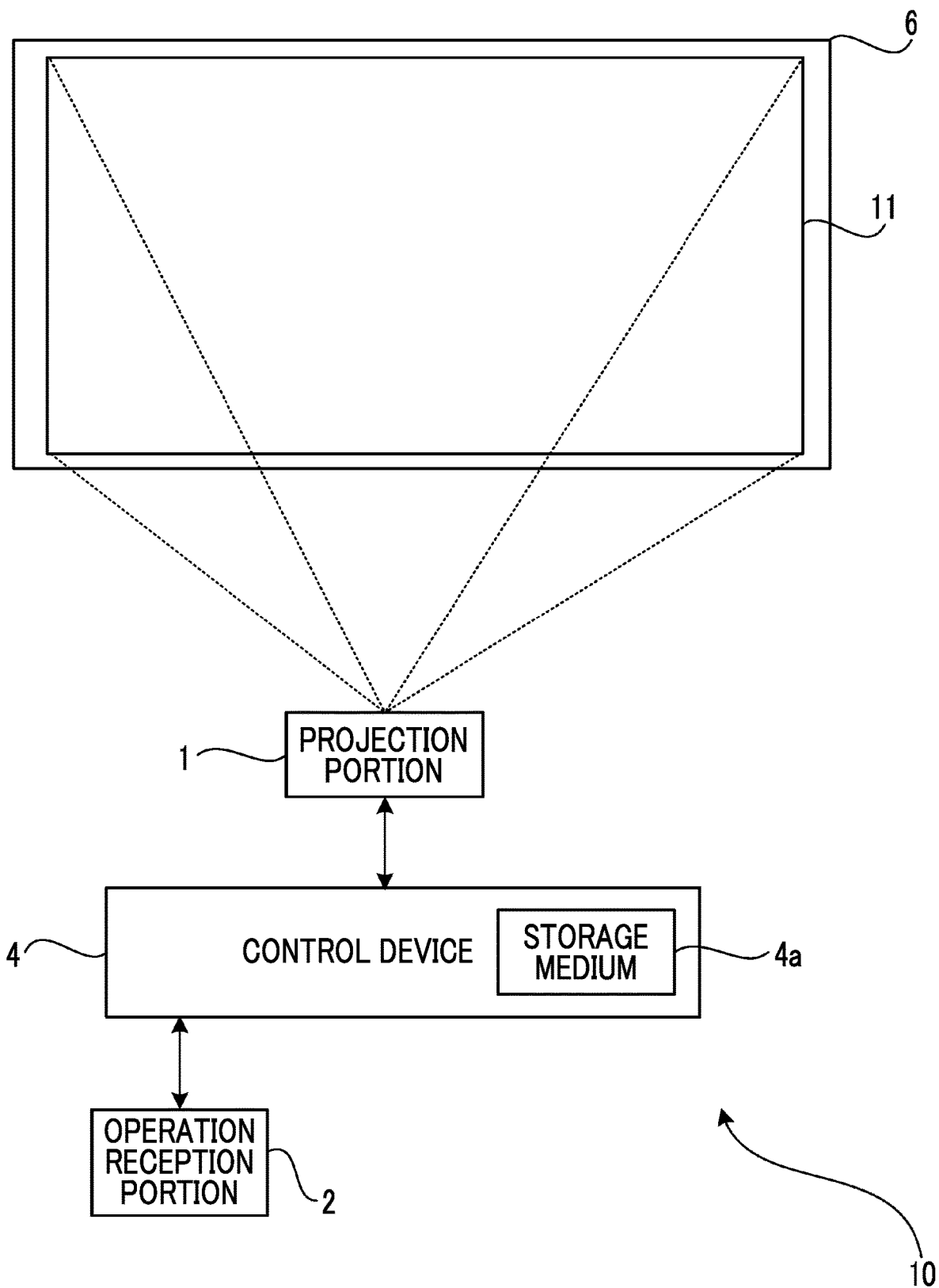
FIG. 1 is a schematic diagram illustrating a schematic configuration of a projection apparatus 10 that is an embodiment of a projection apparatus according to the present invention.

FIG. 1 is a schematic diagram illustrating a schematic configuration of a projection apparatus 10 that is an embodiment of a projection apparatus according to the present invention.

The projection apparatus 10 comprises a projection portion 1, a control device 4, a screen 6, and an operation reception portion 2. The projection portion 1 is configured with, for example, a liquid crystal projector or a projector using liquid crystal on silicon (LCOS). Hereinafter, the projection portion 1 will be described as a liquid crystal projector.

The control device 4 is a device including a control portion configured with various processors, a communication interface (not illustrated) for communicating with each portion, and a storage medium 4a such as a hard disk, a solid state drive (SSD), or a read only memory (ROM) and generally controls the projection portion 1.

Examples of the various processors of the control portion of the control device 4 include a central processing unit (CPU) that is a general-purpose processor performing various processing by executing a program, a programmable logic device (PLD) such as a field programmable gate array (FPGA) that is a processor having a circuit configuration changeable after manufacturing, or a dedicated electric circuit such as an application specific integrated circuit (ASIC) that is a processor having a circuit configuration dedicatedly designed to execute specific processing.

More specifically, a structure of these various processors is an electric circuit in which circuit elements such as semiconductor elements are combined. The control portion of the control device 4 may be configured with one of the various processors or may be configured with a combination of two or more processors of the same type or different types (for example, a combination of a plurality of FPGAs or a combination of a CPU and an FPGA).

The operation reception portion 2 detects an instruction (user instruction) from a user by receiving various operations from the user. The operation reception portion 2 may be a button, a key, a joystick, or the like provided in the control device 4 or a reception portion or the like that receives a signal from a remote controller for remotely operating the control device 4.

The screen 6 is a projection object having a projection surface on which a projection image is displayed by the projection portion 1. In the example illustrated in FIG. 1, the projection surface of the screen 6 is rectangular. It is assumed that upper, lower, left, and right sides of the screen 6 in FIG. 1 are upper, lower, left, and right sides of the actual screen 6.

A projection region 11 is a range irradiated with projection light by the projection portion 1. In the example illustrated in FIG. 1, the projection region 11 is rectangular.

Figure 3:
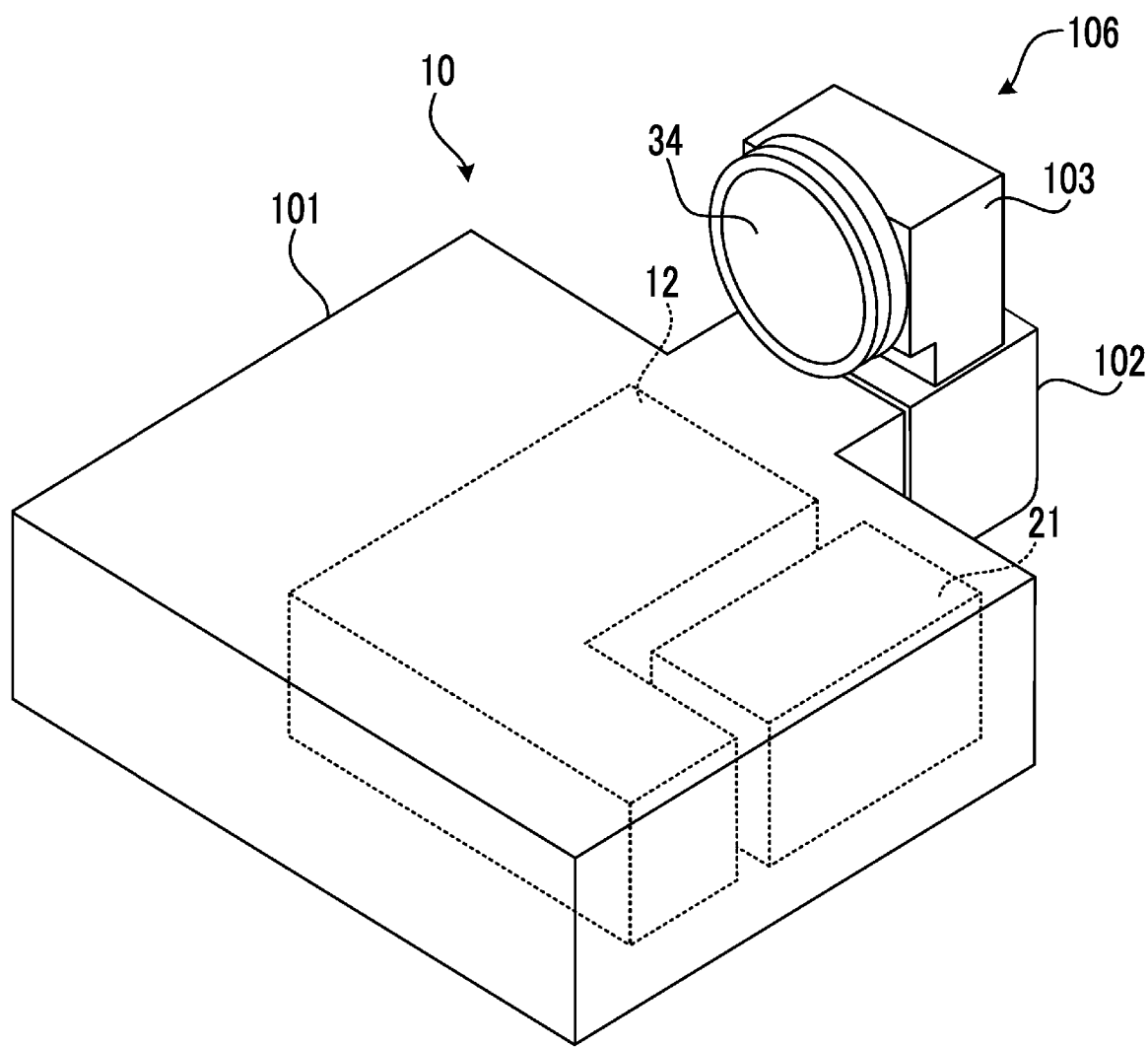
FIG. 3 is a schematic diagram illustrating an exterior configuration of the projection apparatus 10.
Figure 4:
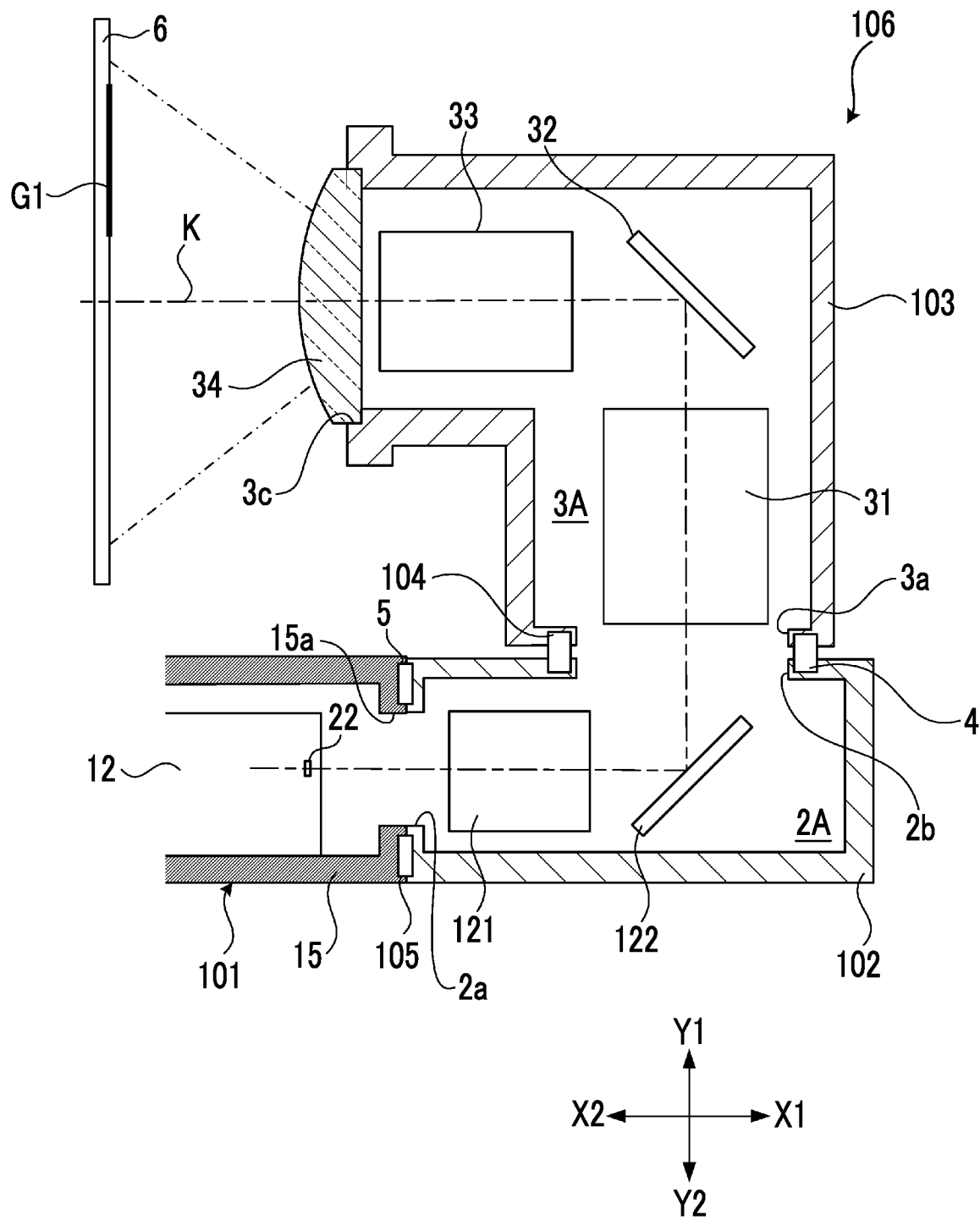
FIG. 4 is a schematic cross-sectional view of an optical unit 106 of the projection apparatus 10 illustrated in FIG. 3.

The projection portion 1, the control device 4, and the operation reception portion 2 are implemented by, for example, one device (for example, refer to FIG. 3 and FIG. 4). Alternatively, the projection portion 1, the control device 4, and the operation reception portion 2 may be separate devices that cooperate by communicating with each other.

<Internal Configuration of Projection Portion 1 Illustrated in FIG. 1>

Figure 2:
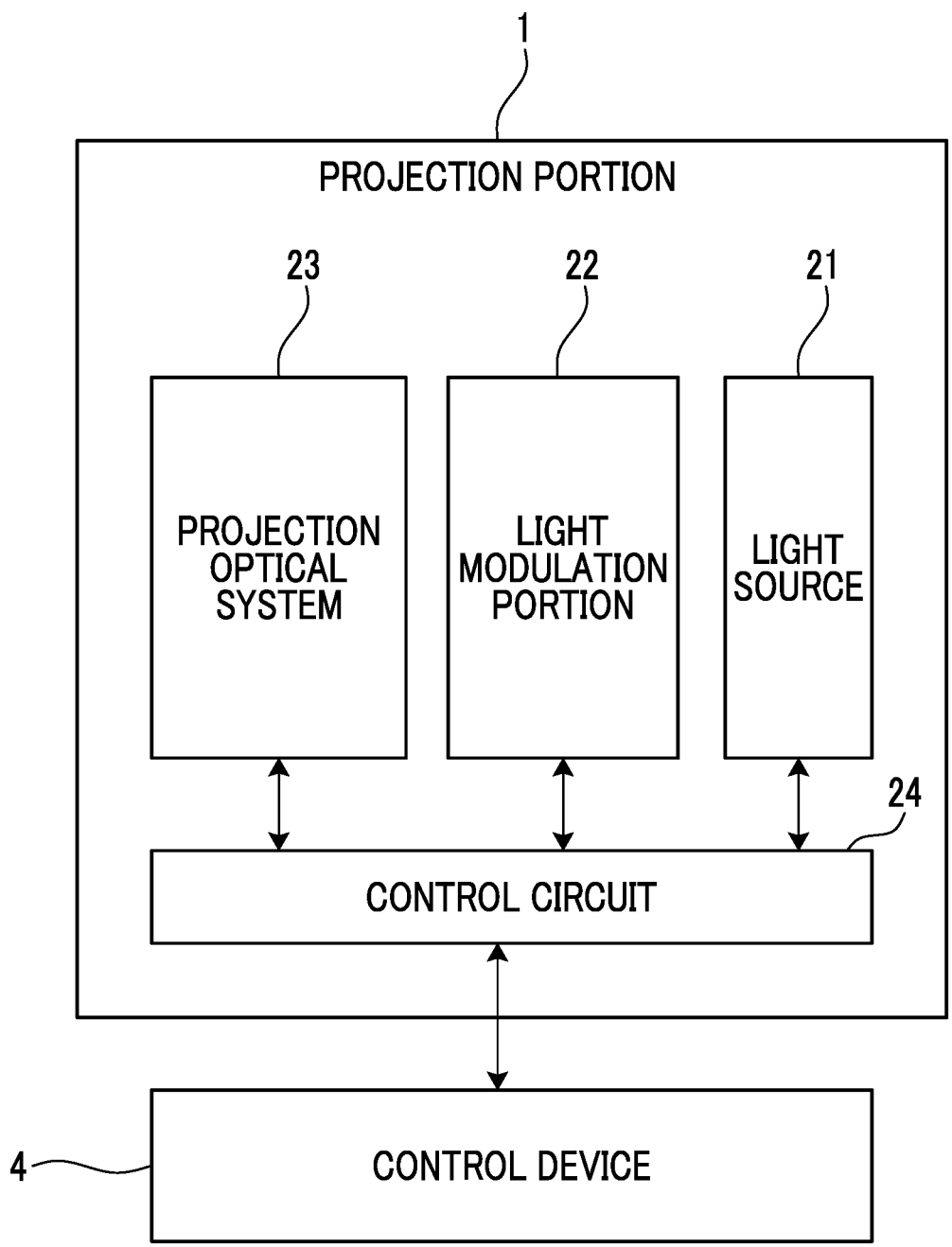
FIG. 2 is a schematic diagram illustrating an example of an internal configuration of a projection portion 1 illustrated in FIG. 1.

FIG. 2 is a schematic diagram illustrating an example of an internal configuration of the projection portion 1 illustrated in FIG. 1.

As illustrated in FIG. 2, the projection portion 1 comprises a light source 21, a light modulation portion 22, a projection optical system 23, and a control circuit 24.

The light source 21 includes a light emitting element such as a laser or a light emitting diode (LED) and emits, for example, white light.

The light modulation portion 22 is configured with three liquid crystal panels that emit each color image by modulating, based on image information, each color light which is emitted from the light source 21 and is separated into three colors of red, blue, and green by a color separation mechanism, not illustrated. Filters of red, blue, and green may be mounted in each of the three liquid crystal panels, and each color image may be emitted by modulating the white light emitted from the light source 21 in each liquid crystal panel.

The light from the light source 21 and the light modulation portion 22 is incident on the projection optical system 23. The projection optical system 23 includes at least one lens and is configured with, for example, a relay optical system. The light that has passed through the projection optical system 23 is projected to the screen 6.

The control circuit 24 projects an image based on display data to the screen 6 by controlling the light source 21, the light modulation portion 22, and the projection optical system 23 based on the display data input from the control device 4. The display data input into the control circuit 24 is configured with three constituents of red display data, blue display data, and green display data.

In addition, the control circuit 24 enlarges or reduces the projection region 11 (refer to FIG. 1) of the projection portion 1 by changing the projection optical system 23 based on an instruction input from the control device 4. In addition, the control device 4 may move the projection region 11 of the projection portion 1 by changing the projection optical system 23 based on the operation received by the operation reception portion 2 from the user.

In addition, the projection apparatus 10 comprises a shift mechanism that mechanically or optically moves the projection region 11 while maintaining an image circle of the projection optical system 23. The image circle of the projection optical system 23 is a region in which the projection light incident on the projection optical system 23 appropriately passes through the projection optical system 23 in terms of a light fall-off, color separation, edge part curvature, or the like.

The shift mechanism is implemented by at least any of an optical system shift mechanism that performs optical system shifting, or an electronic shift mechanism that performs electronic shifting.

The optical system shift mechanism is, for example, a mechanism (for example, refer to FIG. 3 and FIG. 4) that moves the projection optical system 23 in a direction perpendicular to an optical axis, or a mechanism that moves the light modulation portion 22 in the direction perpendicular to the optical axis instead of moving the projection optical system 23. In addition, the optical system shift mechanism may perform the movement of the projection optical system 23 and the movement of the light modulation portion 22 in combination.

The electronic shift mechanism is a mechanism that performs pseudo shifting of the projection region 11 by changing a range through which the light is transmitted in the light modulation portion 22.

In addition, the projection apparatus 10 may comprise a projection direction changing mechanism that moves the image circle of the projection optical system 23 and the projection region 11. The projection direction changing mechanism is a mechanism that changes a projection direction of the projection portion 1 by changing a direction of the projection portion 1 by mechanical rotation (for example, refer to FIG. 3 and FIG. 4).

<Variable Optical Characteristics of Projection Optical System 23>

The projection optical system 23 constitutes an optical system having variable optical characteristics. For example, the optical characteristics of the projection optical system 23 include an angle of view (that is, a focal length of the projection optical system 23) of the image projected by the projection optical system 23. For example, the projection optical system 23 having the variable angle of view can be implemented by including a zoom lens having a variable focal length in the projection optical system 23. Alternatively, the projection optical system 23 having the variable angle of view can be implemented by making the lens included in the projection optical system 23 interchangeable.

Alternatively, the optical characteristics of the projection optical system 23 may include the projection direction corresponding to rotational movement of at least a part (for example, the projection direction changing mechanism) of the projection optical system 23. Alternatively, the optical characteristics of the projection optical system 23 may include the image circle (for example, a size and a shape) of the projection optical system 23. Alternatively, the optical characteristics of the projection optical system 23 may include a plurality of the optical characteristics.

<Mechanical Configuration of Projection Apparatus 10>

FIG. 3 is a schematic diagram illustrating an exterior configuration of the projection apparatus 10. FIG. 4 is a schematic cross-sectional view of an optical unit 106 of the projection apparatus 10 illustrated in FIG. 3. FIG. 4 illustrates a cross section in a plane along an optical path of the light emitted from a body part 101 illustrated in FIG. 3.

As illustrated in FIG. 3, the projection apparatus 10 comprises the body part 101 and the optical unit 106 that is provided to protrude from the body part 101. In the configuration illustrated in FIG. 3, the operation reception portion 2, the control device 4, and the light source 21, the light modulation portion 22, and the control circuit 24 in the projection portion 1 are provided in the body part 101. The projection optical system 23 in the projection portion 1 is provided in the optical unit 106.

The optical unit 106 comprises a first member 102 supported by the body part 101 and a second member 103 supported by the first member 102.

The first member 102 and the second member 103 may be an integrated member. The optical unit 106 may be configured to be attachable to and detachable from the body part 101 (in other words, interchangeably configured).

The body part 101 includes a housing 15 (refer to FIG. 4) in which an opening 15a (refer to FIG. 4) for passing light is formed in a part connected to the optical unit 106.

As illustrated in FIG. 3, the light source 21 and a light modulation unit 12 including the light modulation portion 22 (refer to FIG. 2) that generates an image by spatially modulating the light emitted from the light source 21 based on input image data are provided inside the housing 15 of the body part 101.

The light emitted from the light source 21 is incident on the light modulation portion 22 of the light modulation unit 12 and is spatially modulated and emitted by the light modulation portion 22.

As illustrated in FIG. 4, the image formed by the light spatially modulated by the light modulation unit 12 is incident on the optical unit 106 through the opening 15a of the housing 15 and is projected to the screen 6 as a projection target object. Accordingly, an image G1 is visible from an observer.

As illustrated in FIG. 4, the optical unit 106 comprises the first member 102 including a hollow portion 2A connected to the inside of the body part 101, the second member 103 including a hollow portion 3A connected to the hollow portion 2A, a first optical system 121 and a reflective member 122 arranged in the hollow portion 2A, a second optical system 31, a reflective member 32, a third optical system 33, and a lens 34 arranged in the hollow portion 3A, a shift mechanism 105, and a projection direction changing mechanism 104.

The first member 102 is a member having, for example, a rectangular cross-sectional exterior, in which an opening 2a and an opening 2b are formed in surfaces perpendicular to each other. The first member 102 is supported by the body part 101 in a state where the opening 2a is arranged at a position facing the opening 15a of the body part 101. The light emitted from the light modulation portion 22 of the light modulation unit 12 of the body part 101 is incident into the hollow portion 2A of the first member 102 through the opening 15a and the opening 2a.

An incidence direction of the light incident into the hollow portion 2A from the body part 101 will be referred to as a direction X1. A direction opposite to the direction X1 will be referred to as a direction X2. The direction X1 and the direction X2 will be collectively referred to as a direction X. In addition, in FIG. 4, a direction from the front to the back of the page and an opposite direction will be referred to as a direction Z. In the direction Z, the direction from the front to the back of the page will be referred to as a direction Z1, and the direction from the back to the front of the page will be referred to as a direction Z2.

In addition, a direction perpendicular to the direction X and the direction Z will be referred to as a direction Y. In the direction Y, an upward direction in FIG. 4 will be referred to as a direction Y1, and a downward direction in FIG. 4 will be referred to as a direction Y2. In the example in FIG. 4, the projection apparatus 10 is arranged such that the direction Y2 is a vertical direction.

The projection optical system 23 illustrated in FIG. 2 is composed of the first optical system 121, the reflective member 122, the second optical system 31, the reflective member 32, the third optical system 33, and the lens 34. An optical axis K of the projection optical system 23 is illustrated in FIG. 4. The first optical system 121, the reflective member 122, the second optical system 31, the reflective member 32, the third optical system 33, and the lens 34 are arranged in this order from the light modulation portion 22 side along the optical axis K.

The first optical system 121 includes at least one lens and guides the light that is incident on the first member 102 from the body part 101 and travels in the direction X1, to the reflective member 122.

The reflective member 122 reflects the light incident from the first optical system 121 in the direction Y1. The reflective member 122 is configured with, for example, a mirror. In the first member 102, the opening 2b is formed on the optical path of the light reflected by the reflective member 122, and the reflected light travels to the hollow portion 3A of the second member 103 by passing through the opening 2b.

The second member 103 is a member having an approximately T-shaped cross-sectional exterior, in which an opening 3a is formed at a position facing the opening 2b of the first member 102. The light that has passed through the opening 2b of the first member 102 from the body part 101 is incident into the hollow portion 3A of the second member 103 through the opening 3a. The first member 102 and the second member 103 may have any cross-sectional exterior and are not limited to the above.

The second optical system 31 includes at least one lens and guides the light incident from the first member 102 to the reflective member 32.

The reflective member 32 guides the light incident from the second optical system 31 to the third optical system 33 by reflecting the light in the direction X2. The reflective member 32 is configured with, for example, a mirror.

The third optical system 33 includes at least one lens and guides the light reflected by the reflective member 32 to the lens 34.

The lens 34 is arranged in an end part of the second member 103 on the direction X2 side in the form of closing the opening 3c formed in this end part. The lens 34 projects the light incident from the third optical system 33 to the screen 6.

The projection direction changing mechanism 104 is a rotation mechanism that rotatably connects the second member 103 to the first member 102. By the projection direction changing mechanism 104, the second member 103 is configured to be rotatable about a rotation axis (specifically, the optical axis K) that extends in the direction Y. The projection direction changing mechanism 104 is not limited to an arrangement position illustrated in FIG. 4 as long as the projection direction changing mechanism 104 can rotate the optical system. In addition, the number of rotation mechanisms is not limited to one, and a plurality of rotation mechanisms may be provided.

The shift mechanism 105 is a mechanism for moving the optical axis K of the projection optical system (in other words, the optical unit 106) in a direction (direction Y in FIG. 4) perpendicular to the optical axis K. Specifically, the shift mechanism 105 is configured to be capable of changing a position of the first member 102 in the direction Y with respect to the body part 101. The shift mechanism 105 may manually move the first member 102 or electrically move the first member 102.

FIG. 4 illustrates a state where the first member 102 is moved as far as possible to the direction Y1 side by the shift mechanism 105. By moving the first member 102 in the direction Y2 by the shift mechanism 105 from the state illustrated in FIG. 4, a relative position between a center of the image (in other words, a center of a display surface) formed by the light modulation portion 22 and the optical axis K changes, and the image G1 projected to the screen 6 can be shifted (translated) in the direction Y2.

The shift mechanism 105 may be a mechanism that moves the light modulation portion 22 in the direction Y instead of moving the optical unit 106 in the direction Y. Even in this case, the image G1 projected to the screen 6 can be moved in the direction Y2.

<Shift Regulation by Projection Apparatus 10>

Figure 5:
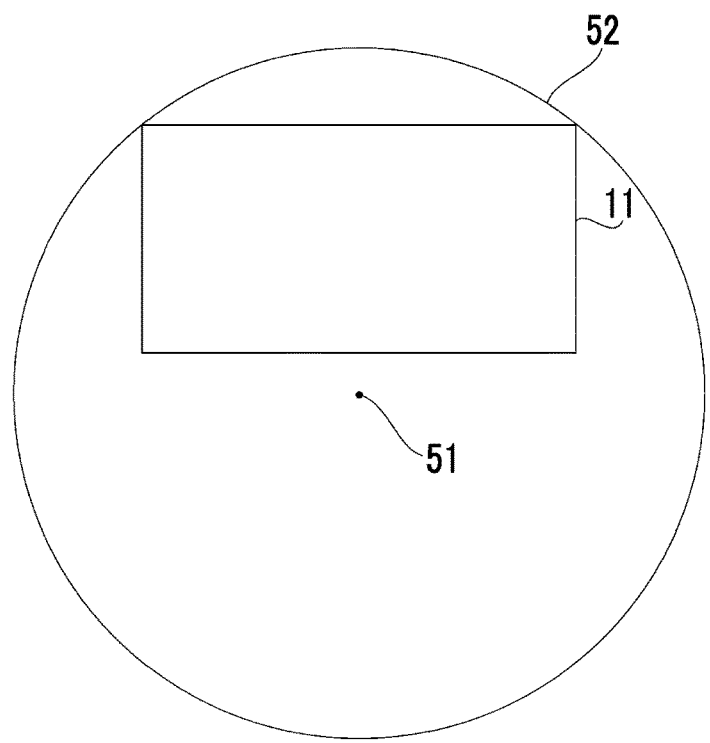
FIG. 5 is a diagram for describing an example of shift regulation by the projection apparatus 10.

FIG. 5 is a diagram for describing an example of shift regulation by the projection apparatus 10. An optical axis 51 illustrated in FIG. 5 is the optical axis of the projection optical system 23. An image circle 52 is the image circle of the projection optical system 23.

Specifically, the image circle 52 is a region in which the projection light incident on the projection optical system 23 appropriately passes through the projection optical system 23 in terms of a light fall-off, color separation, edge part curvature, or the like. The optical axis 51 is positioned at a center of the image circle 52. FIG. 5 illustrates the optical axis 51 and the image circle 52 in a view from a direction parallel to the optical axis 51.

For example, the control device 4 performs a control of regulating the movement of the projection region 11 by the shift mechanism so that the projection region 11 does not deviate from the image circle 52. For example, the shift mechanism on which the regulation is performed corresponds to the optical system shifting by the optical system shift mechanism. However, the shift mechanism on which the regulation is performed may correspond to the electronic shifting by the electronic shift mechanism or may correspond to both of the optical system shifting by the optical system shift mechanism and the electronic shifting by the electronic shift mechanism.

For example, a position of the projection region 11 is set such that a center of the projection region 11 (an intersection between diagonal lines of the projection region 11) matches the optical axis 51 as an initial state. The control device 4 moves the projection region 11 by the shift mechanism in accordance with a user operation performed on the operation reception portion 2.

For example, in the example illustrated in FIG. 5, the projection region 11 moves in an upward direction (an upward direction in FIG. 5), and an upper right corner and an upper left corner of the projection region 11 reach an end part of the image circle 52. In a case where the projection region 11 further moves in the upward direction from this state, an end part (for example, an upper right part and an upper left part) of the projection region 11 deviates from the image circle 52, and a decrease in projection quality such as a light fall-off occurs in the end part of the projection region 11.

Regarding this point, the control device 4 performs the control of regulating the movement of the projection region 11 so that the projection region 11 does not move anymore in the upward direction. For example, in the state illustrated in FIG. 5, even in a case where the user operation of further moving the projection region 11 in the upward direction is received, the control device 4 does not move the projection region 11 in the upward direction.

At this point, the control device 4 may notify the user that the projection region 11 cannot be moved anymore in the upward direction, by voice, screen display, or the like. Then, in a case where the user operation of moving the projection region 11 in the upward direction is further received, the control device 4 may move the projection region 11 in the upward direction.

For example, the image circle 52 changes in accordance with the lens of the projection optical system 23. Accordingly, the control device 4 determines the current lens of the projection optical system 23 and performs the regulation of the movement of the projection region 11 corresponding to the image circle 52 corresponding to the determined lens.

According to the projection apparatus 10, even in a case where the optical characteristics of the projection optical system 23 are variable, a decrease in projection quality such as a light fall-off, color separation, or edge part curvature can be suppressed by performing the control of regulating the movement of the projection region 11 to which the image is projected, based on the current optical characteristics of the projection optical system 23.

For example, the projection apparatus 10 derives a shift range that is a movable range of the projection region 11 based on the optical characteristics of the projection optical system 23 and regulates the movement of the projection region 11 using the derived shift range.

Figure 6:
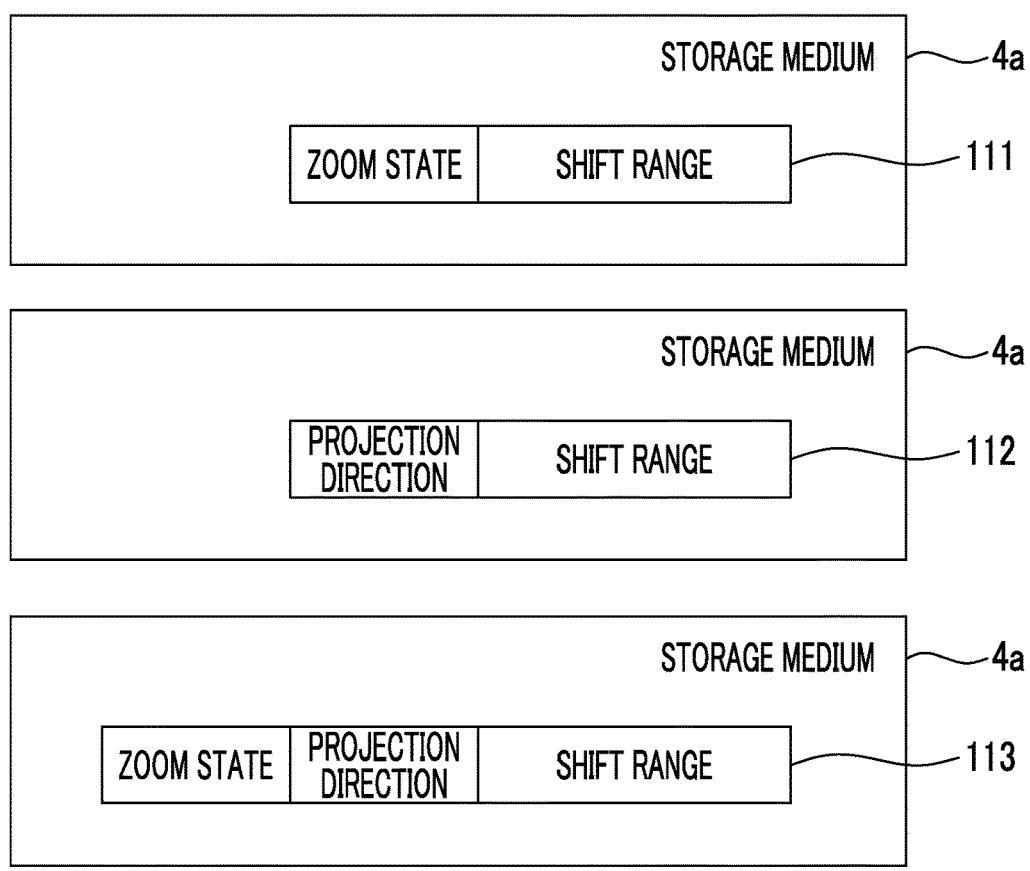
FIG. 6 is a diagram (Part 1) illustrating a specific example of information in which optical characteristics of a projection optical system 23 are associated with a shift range.
Figure 7:
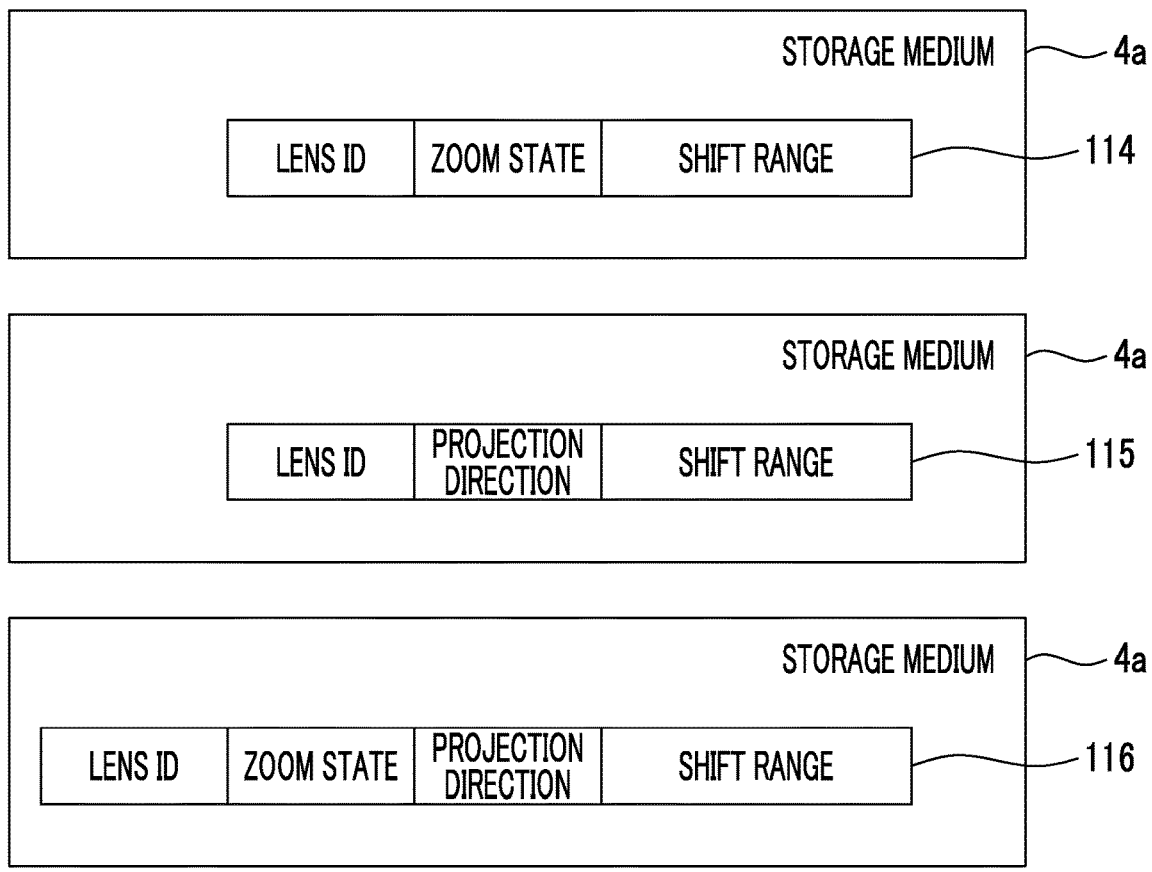
FIG. 7 is a diagram (Part 2) illustrating a specific example of the information in which the optical characteristics of the projection optical system 23 are associated with the shift range.

Specific Example of Information in which Optical Characteristics of Projection Optical System 23 are Associated with Shift Range FIG. 6 and FIG. 7 are diagrams illustrating a specific example of information in which the optical characteristics of the projection optical system 23 are associated with the shift range.

For example, the control device 4 stores at least any of correspondence information 111 to 116 illustrated in FIG. 6 and FIG. 7 in the storage medium 4a (refer to FIG. 1). For example, the correspondence information 111 to 116 are created in advance by simulation, experiment, or the like in accordance with a design of the projection optical system 23 and are stored in the storage medium 4a.

The correspondence information 111 in FIG. 6 is correspondence information indicating a corresponding shift range for a plurality of zoom states. The zoom state is the angle of view of the projection optical system 23 including the zoom lens. For example, the control device 4 performs the control of regulating the movement of the projection region 11 so that the projection region 11 does not deviate from the shift range derived based on the current angle of view of the projection optical system 23 and the correspondence information 111.

The correspondence information 112 in FIG. 6 is correspondence information indicating a corresponding shift range for a plurality of projection directions. The projection direction is the projection direction of the projection optical system 23 based on the rotational movement of the projection direction changing mechanism 104. For example, the control device 4 performs the control of regulating the movement of the projection region 11 so that the projection region 11 does not deviate from the shift range derived based on the current projection direction of the projection optical system 23 and the correspondence information 112.

The correspondence information 113 in FIG. 6 is correspondence information indicating a corresponding shift range for a plurality of combinations of the zoom states and the projection directions. For example, the control device 4 performs the control of regulating the movement of the projection region 11 so that the projection region 11 does not deviate from the shift range derived based on the current zoom state and projection direction and the correspondence information 113.

The correspondence information 114 in FIG. 7 is correspondence information indicating a corresponding shift range for a plurality of combinations of the lens IDs and the zoom states. The lens ID is an identifier of the lens mounted in the projection optical system 23 in which the lens is interchangeable. For example, the control device 4 performs the control of regulating the movement of the projection region 11 so that the projection region 11 does not deviate from the shift range derived based on the current lens ID and zoom state and the correspondence information 114.

The correspondence information 115 in FIG. 7 is correspondence information indicating a corresponding shift range for a plurality of combinations of the lens IDs and the projection directions. For example, the control device 4 performs the control of regulating the movement of the projection region 11 so that the projection region 11 does not deviate from the shift range derived based on the current lens ID and projection direction and the correspondence information 115.

The correspondence information 116 in FIG. 7 is correspondence information indicating a corresponding shift range for a plurality of combinations of the lens IDs, the zoom states, and the projection directions. For example, the control device 4 performs the control of regulating the movement of the projection region 11 so that the projection region 11 does not deviate from the shift range derived based on the current lens ID, zoom state, and projection direction and the correspondence information 116.

As illustrated in FIG. 6 and FIG. 7, the control device 4 may perform the control of regulating the movement of the projection region 11 based on information between the optical characteristics of the projection optical system 23 and the shift range which is the movable range of the projection region 11. Specifically, the control device 4 may acquire the correspondence information in which the optical characteristics of the projection optical system 23 are associated with the shift range, and perform the control of regulating the movement of the projection region 11 based on the acquired correspondence information and the optical characteristics of the projection optical system 23.

In addition, as illustrated in FIG. 7, in a case where the lens included in the projection optical system 23 is interchangeable, the control device 4 may perform the control of regulating the movement of the projection region 11 based on a combination of the lens ID of the lens included in the projection optical system 23 and the optical characteristics of the projection optical system 23. Specifically, the control device 4 may acquire the correspondence information in which the combination of the lens ID and the optical characteristics is associated with the shift range, and perform the control of regulating the movement of the projection region 11 based on the acquired correspondence information and the combination of the lens ID of the lens included in the projection optical system 23 and the optical characteristics of the projection optical system 23.

While the control of regulating the movement of the projection region 11 by deriving the shift range based on the correspondence information between the optical characteristics of the projection optical system 23 and the shift range is described, the control of regulating the movement of the projection region 11 may be performed by deriving the shift range by calculation based on the optical characteristics of the projection optical system 23.

<Calculation Processing of Shift Regulation by Projection Apparatus 10>

Figure 8:
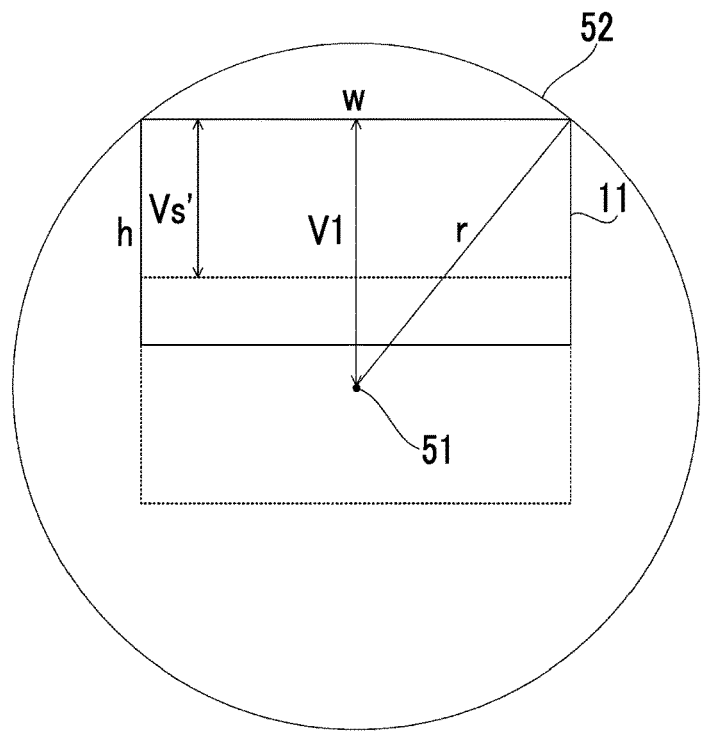
FIG. 8 is a diagram for describing an example of calculation processing of the shift regulation by the projection apparatus 10.

FIG. 8 is a diagram for describing an example of calculation processing of the shift regulation by the projection apparatus 10. In FIG. 8, a rectangle illustrated by a dotted line illustrates an initial position of the projection region 11.

For example, in a case where the lens of the projection optical system 23 is interchangeable, the image circle 52 changes depending on the lens mounted in the projection optical system 23.

A radius r is a radius of the image circle 52. In the correspondence information 111 to 116 illustrated in FIG. 6 and FIG. 7, for example, the radius r of the image circle 52 is stored as the shift range. Accordingly, the control device 4 can derive the radius r as the shift range based on the optical characteristics of the projection optical system 23 or based on a combination of the optical characteristics of the projection optical system 23 and the lens ID.

A height h is a length of the projection region 11 in upward and downward directions. A width w is a length of the projection region 11 in left and right directions. The height h and the width w are decided in accordance with a design of the light modulation portion 22 and thus, for example, are stored in advance in the storage medium 4a of the control device 4. In addition, in a case of performing the electronic shifting of performing pseudo changing of the projection region 11 by changing the range through which the light is transmitted in the light modulation portion 22, the control device 4 may set the height h and the width w to the height and the width of the projection region 11 after the pseudo changing by the electronic shifting.

In FIG. 7, V1 denotes a distance between an upper edge of the projection region 11 and the optical axis 51 in a state where the upper right corner and the upper left corner of the projection region 11 reach the end part of the image circle 52. For example, V1 can be calculated using Expression (1) below.

$$V1=(r^2-(w/2)^2)^{0.5} \quad (1)$$

The control device 4 performs a control of moving the projection region 11 in the upward direction within a range in which the distance between the upper edge of the projection region 11 and the optical axis 51 is not greater than V1, in accordance with the user operation providing an instruction to move the projection region 11 in the upward direction. Accordingly, deviation of the projection region 11 to an upper side of the image circle 52 can be avoided.

However, the regulation of the movement of the projection region 11 is not limited to this method. For example, in FIG. 6, Vs' denotes a movement amount of the upper edge of the projection region 11 in a case where the projection region 11 is moved from the initial position to the position illustrated in FIG. 8. For example, Vs' can be calculated using Expression (2) below.

$$Vs'=V1-0.5\,h \quad (2)$$

The control device 4 may perform the control of moving the projection region 11 in the upward direction within a range in which the movement amount of the projection region 11 in the upward direction from the initial position is not greater than Vs', in accordance with the user operation of providing the instruction to move the projection region 11 in the upward direction. Accordingly, the deviation of the projection region 11 to the upper side of the image circle 52 can be avoided.

Alternatively, the control device 4 may avoid the deviation of the projection region 11 to the upper side of the image circle 52 by regulating the movement of the projection region 11 in the upward direction using a ratio of the height h of the projection optical system 23 and the movement amount of the projection region 11 in the upward direction.

Figure 9:
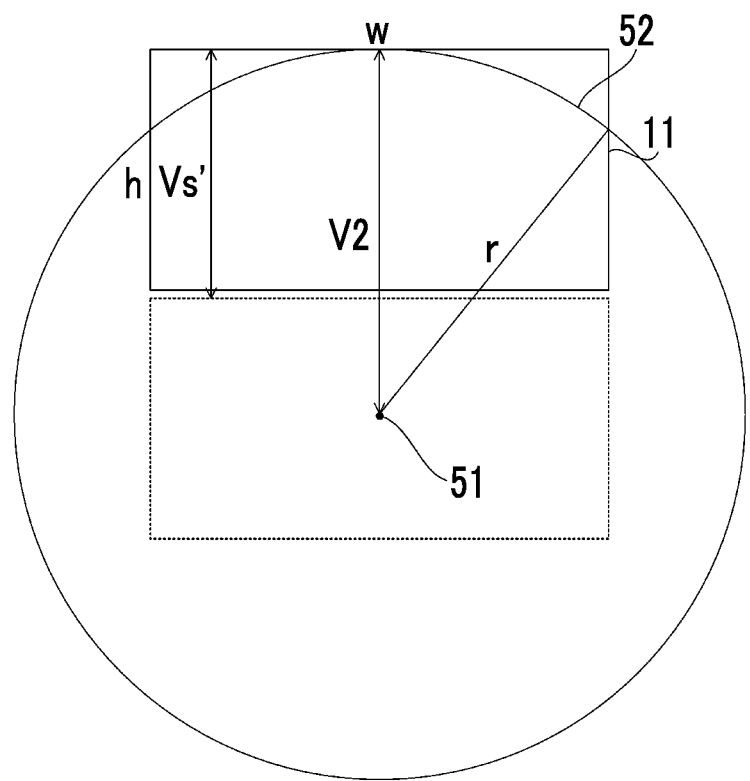
FIG. 9 is a diagram for describing another example of the calculation processing of the shift regulation by the projection apparatus 10.

FIG. 9 is a diagram for describing another example of the calculation processing of the shift regulation by the projection apparatus 10. In FIG. 9, a rectangle illustrated by a dotted line illustrates the initial position of the projection region 11.

In FIG. 9, V2 denotes the distance between the upper edge of the projection region 11 and the optical axis 51 in a state where the upper edge of the projection region 11 reaches an upper end of the image circle 52. For example, V2 can be calculated using Expression (3) below.

$$V2=r \quad (3)$$

For example, the control device 4 performs the control of moving the projection region 11 in the upward direction within a range in which the distance between the upper edge of the projection region 11 and the optical axis 51 is not greater than V2, in accordance with the user operation providing the instruction to move the projection region 11 in the upward direction. Accordingly, deviation of the entire upper edge of the projection region 11 to the upper side of the image circle 52 can be avoided.

However, the regulation of the movement of the projection region 11 in the upward direction is not limited to this method. For example, in FIG. 9, Vs' denotes the movement amount of the upper edge of the projection region 11 in a case where the projection region 11 is moved from the initial position to the position illustrated in FIG. 9. For example, Vs' in FIG. 9 can be calculated using Expression (4) below.

$$Vs'=V2-0.5\,h \quad (4)$$

The control device 4 may perform the control of moving the projection region 11 in the upward direction within a range in which the movement amount of the projection region 11 in the upward direction from the initial position is not greater than Vs' in FIG. 9, in accordance with the user operation of providing the instruction to move the projection region 11 in the upward direction. Accordingly, the deviation of the entire upper edge of the projection region 11 to the upper side of the image circle 52 can be avoided.

Alternatively, the control device 4 may avoid the deviation of the entire upper edge of the projection region 11 to the upper side of the image circle 52 by regulating the movement of the projection region 11 in the upward direction using the ratio of the height h of the projection optical system 23 and the movement amount of the projection region 11 in the upward direction.

As described using FIG. 9, the control device 4 may set the shift range within which the projection region 11 can move as a range within which a part of the projection region 11 may deviate from the image circle 52. Accordingly, while the projection quality in a part of the projection region 11 may be decreased, the shift range within which the projection region 11 can move can be widened.

In addition, the shift range within which the projection region 11 can move is not limited to the illustration in FIG. 8 and FIG. 9 and can be set to any range within which the projection quality in the part of the projection region 11 can be allowed. In addition, the control device 4 may be able to switch the shift range within which the projection region 11 can move. The switching of the shift range may be performed in accordance with the reception of the user operation through the operation reception portion 2 or may be automatically performed based on various information such as a content of the projection image and an installation situation of the projection apparatus 10.

While the control of regulating the movement of the projection region 11 in the upward direction is described, the control device 4 also performs the control of regulating the movement of the projection region 11 in each of the downward direction, the left direction, and the right direction. In addition, the control device 4 may also perform the control of regulating the movement of the projection region 11 in each oblique direction.

While the control of regulating the movement of the projection region 11 so that the projection region 11 does not deviate from the image circle 52 is described, a purpose of regulating the movement of the projection region 11 is not limited to the deviation of the projection region 11 from the image circle 52. For example, the control device 4 may perform the control of regulating the movement of the projection region 11 so that the projection region 11 is not blocked (vignetted) by the body part 101 or the like of the projection apparatus 10 (for example, refer to FIG. 10 and FIG. 11).

<Regulation of Movement of Projection Region 11 Based on Lens ID of Projection Optical System 23>

Figure 10:
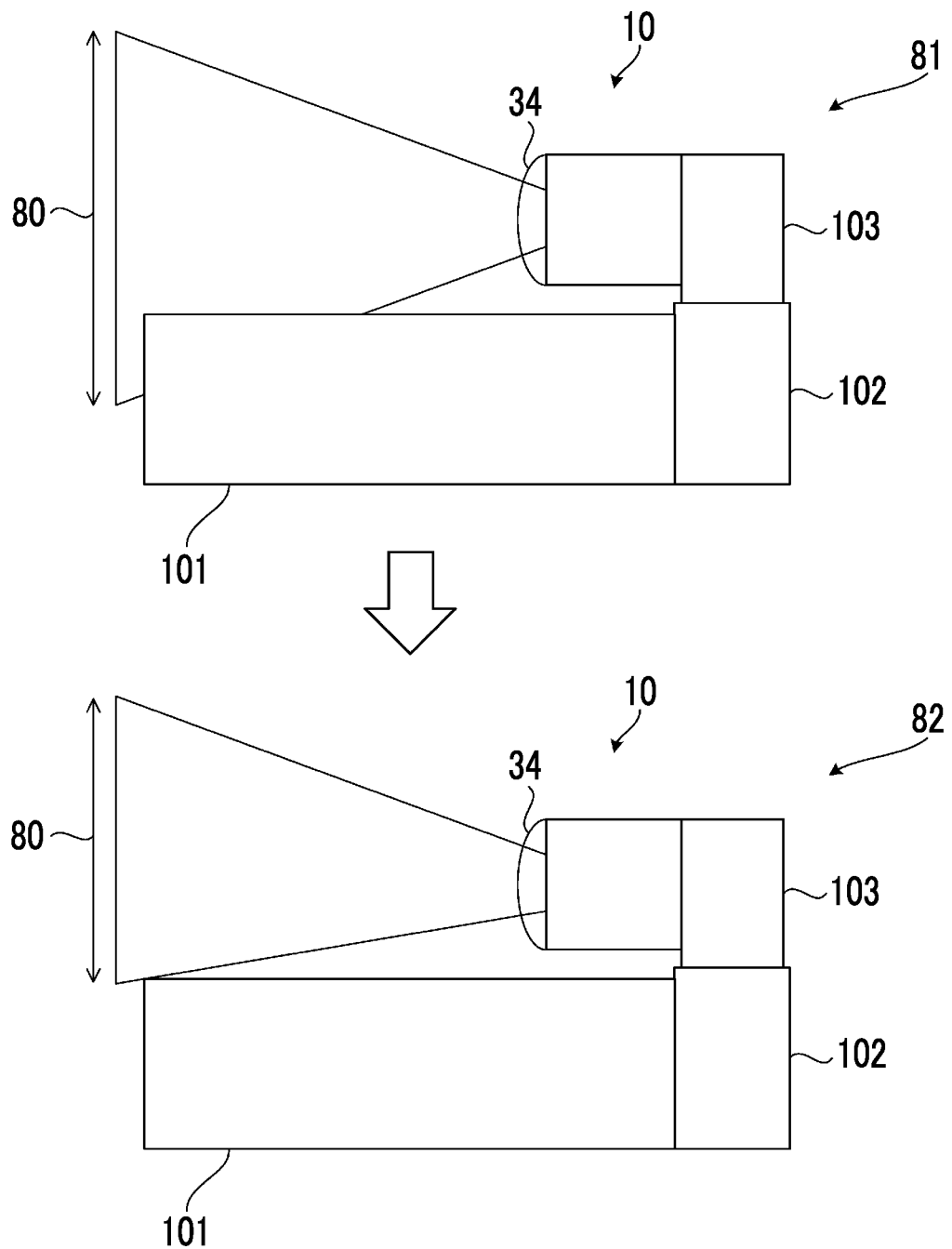
FIG. 10 is a diagram illustrating an example of regulation of movement of a projection region 11 based on a lens ID of a lens mounted in the projection optical system 23.

FIG. 10 is a diagram illustrating an example of the regulation of the movement of the projection region 11 based on the lens ID of the lens mounted in the projection optical system 23.

The control device 4 may perform the control of regulating the movement of the projection region 11 based on the lens ID of the lens mounted in the projection optical system 23. For example, the image circle of the projection optical system 23 may be blocked by the body part 101 or the like depending on the lens mounted in the projection optical system 23.

For example, as in a state 81 in FIG. 10, a state where the image circle of the projection optical system 23 is blocked by the body part 101 by interchanging the lens of the projection optical system 23 is assumed. A shift range 80 is a range within which the projection region 11 can move in the upward and downward directions (the Y direction in FIG. 2) and, in the state 81, is a range of the image circle of the projection optical system 23 in the upward and downward directions.

The storage medium 4a stores the correspondence information between the lens ID of the lens mounted in the projection optical system 23 and the shift range. The control device 4 acquires the lens ID of the lens mounted in the projection optical system 23, derives the shift range corresponding to the acquired lens ID from the correspondence information in the storage medium 4a, and performs the control of regulating the movement of the projection region 11 using the derived shift range.

Accordingly, for example, as illustrated in a state 82, the shift range 80 is reduced to not include a part blocked by the body part 101. The control device 4 can avoid the blocking of the projection region 11 by the body part 101 by moving the projection region 11 in the upward and downward directions within a range of the reduced shift range 80.

In addition, the storage medium 4a may store correspondence information between the shift range and the combination of the lens ID and the projection direction of the projection optical system 23. In this case, the control device 4 performs the control of regulating the movement of the projection region 11 using the shift range corresponding to the combination of the lens ID and the projection direction of the projection optical system 23.

For example, such a control can be implemented by setting a range that is not blocked by the body part 101 or the like and corresponds to characteristics of the lens indicated by the lens ID and the projection direction of the projection optical system 23, as the shift range in the correspondence information 115 and 116 (refer to FIG. 7) in which the combination of the lens ID and the projection direction of the projection optical system 23 is associated with the shift range.

<Movement of Projection Region 11 Based on Change in Projection Direction of Projection Optical System 23>

Figure 11:
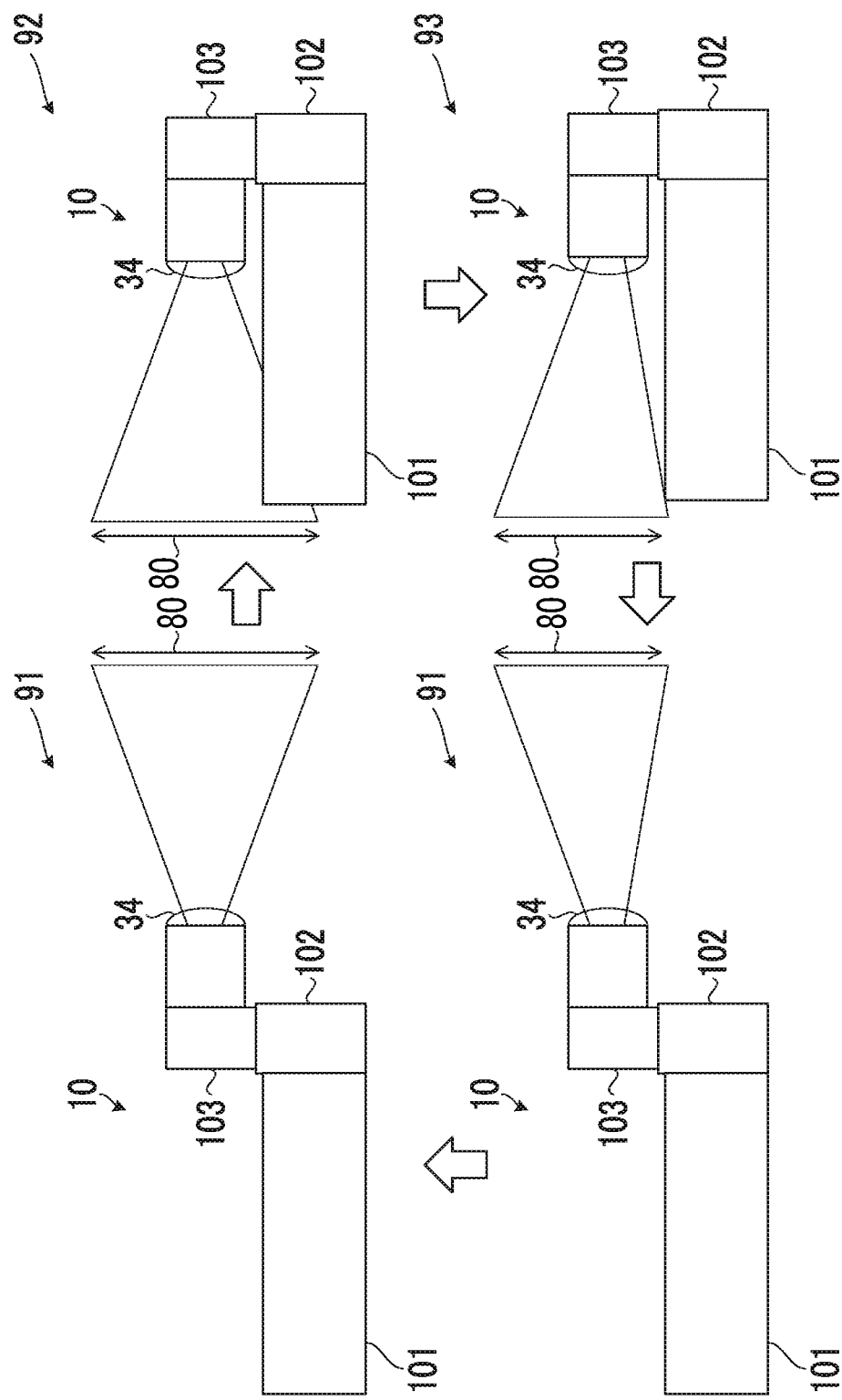
FIG. 11 is a diagram illustrating an example of the movement of the projection region 11 based on a change in projection direction of the projection optical system 23.

FIG. 11 is a diagram illustrating an example of the movement of the projection region 11 based on a change in projection direction of the projection optical system 23.

In a state 91, the projection direction of the projection optical system 23 is an opposite direction to the body part 101. In this state, since the image circle of the projection optical system 23 is not blocked by the body part 101, for example, the shift range corresponding to the image circle is set in advance in the correspondence information with respect to the projection direction illustrated in the state 91.

Accordingly, the control device 4 controls the movement of the projection region 11 within the image circle of the projection optical system 23.

In the state 91, in a case where the projection direction of the projection optical system 23 changes by 180 degrees because of the rotational movement of the projection direction changing mechanism 104, a state 92 is set. In the state 92, the image circle of the projection optical system 23 is blocked by the body part 101 as in the state 81 in FIG. 10. Thus, for example, a shift range narrower than the image circle is set in advance in the correspondence information with respect to the projection direction illustrated in the state 92.

Accordingly, the control device 4 reduces the shift range 80 to not include a part blocked by the body part 101. Accordingly, a state 93 is set, and the blocking of the projection region 11 by the body part 101 can be avoided as in the state 82 in FIG. 10.

At this point, in a case where the projection region 11 is included in the shift range 80 in the state 92, and the projection region 11 deviates from the shift range 80 in the state 93, the control device 4 performs a control of moving the projection region 11 to fall within the shift range 80. In such a case of moving the projection region 11 in accordance with a change in optical characteristics of the projection optical system 23, the control device 4 stores the projection region 11 before change in the storage medium 4a (memory).

In the state 93, in a case where the projection direction of the projection optical system 23 changes by 180 degrees because of the rotational movement of the projection direction changing mechanism 104, a state 94 is set. The state 94 is a state where the shift range 80 is reduced even in a case where the image circle of the projection optical system 23 is not blocked by the body part 101.

In this case, the control device 4 restores the shift range 80 to the original range based on the correspondence information between the projection direction and the shift range. Accordingly, the state 91 is restored, and the shift range 80 within which the projection region 11 can move can be widened. In such a case where the projection direction before change is restored by a change in projection direction of the projection optical system 23, the control device 4 performs a control of restoring the projection region 11 to the original position stored in the storage medium 4a.

As described using FIG. 10 and FIG. 11, the shift range which is the movable range of the projection region 11 is not limited to the image circle of the projection optical system 23 and may be a range determined in accordance with blocking of the projection light by the projection apparatus 10 (for example, the body part 101).

In addition, as described using FIG. 11, in a case where the projection region 11 deviates from the shift range corresponding to the current projection direction of the projection optical system 23 in accordance with the change in optical characteristics of the projection optical system 23, the control device 4 performs the control of moving the projection region 11 so that the projection region 11 falls within the shift range corresponding to the current projection direction of the projection optical system 23.

In addition, in a state where the projection region 11 is moved based on the regulation of the movement of the projection region 11 in accordance with the change in optical characteristics of the projection optical system 23, in a case where the optical characteristics of the projection optical system 23 are restored to the optical characteristics before change by a further change in optical characteristics of the projection optical system 23, the control device 4 performs the control of restoring the projection region 11 to the projection region 11 before change.

For example, in a case of moving the projection region 11 in accordance with the change in optical characteristics of the projection optical system 23, the control device 4 stores the projection region 11 before change in the storage medium 4a. In a case where the projection direction before change is restored by a change in optical characteristics of the projection optical system 23, the control device 4 performs the control of restoring the projection region 11 to the original position stored in the storage medium 4a. Accordingly, in a case where a reason for the regulation is fulfilled after the projection region 11 is moved based on the regulation of the movement of the projection region 11, the projection region 11 can be restored to the original position.

Modification Example

While a configuration in which the control device 4 moves the projection region 11 by the shift mechanism in accordance with the user operation performed on the operation reception portion 2 is described, the control device 4 may automatically move the projection region 11 based on various information. For example, an imaging apparatus that images the screen 6 may be provided in the projection apparatus 10, and the control device 4 may perform a control of moving the projection region 11 to a range of the screen 6 specified by processing based on an image obtained by imaging of an imaging element of the imaging apparatus.

The present invention is not limited to a configuration in which the shift range corresponding to the projection direction of the projection optical system 23 is obtained in advance by simulation, experiment, or the like and set. The control device 4 may be configured to calculate the shift range based on the projection direction of the projection optical system 23, a shape of the body part 101, optical information of the projection optical system 23, and the like.

While the configurations illustrated in FIG. 2, FIG. 3, and FIG. 11 are described as a configuration of the projection apparatus 10 including the projection direction as variable optical characteristics in the optical system, the present invention is not limited thereto. For example, various configurations of the projection apparatus 10 in which a range blocked by the body part 101 or the like in the image circle changes in accordance with the lens mounted in the projection optical system in the projection apparatus in which the lens of the projection optical system is interchangeable can be used.

While the configuration illustrated in FIG. 10 is described as a configuration of the projection apparatus 10 in which the lens of the projection optical system is interchangeable, the present invention is not limited thereto. For example, various configurations of the projection apparatus 10 in which the range blocked by the body part 101 or the like in the image circle changes in accordance with a change in projection direction can be used.

At least the following matters are disclosed in the present specification.

(1) A projection apparatus that projects an image by an optical system having variable optical characteristics, the projection apparatus comprising a processor configured to perform a control of regulating movement of a projection region to which the image is projected, based on the optical characteristics in the optical system.

(2) The projection apparatus according to (1), in which the processor is configured to perform the control based on information of the optical characteristics and a movable range of the projection region.

(3) The projection apparatus according to (2), in which the processor is configured to acquire correspondence information in which the optical characteristics are associated with the movable range of the projection region, and perform the control based on the acquired correspondence information and the optical characteristics in the optical system.

(4) The projection apparatus according to any one of (1) to (3), in which the optical characteristics include an angle of view.

(5) The projection apparatus according to any one of (1) to (4), in which the optical characteristics include a projection direction corresponding to rotational movement of at least a part of the optical system.

(6) The projection apparatus according to any one of (1) to (5), in which the optical characteristics include an image circle.

(7) The projection apparatus according to any one of (1) to (6), in which a lens included in the optical system is interchangeable, and the processor is configured to perform the control based on a combination of an identifier of the lens included in the optical system and the optical characteristics in the optical system.

(8) The projection apparatus according to (7), in which the processor is configured to acquire correspondence information in which the combination of the identifier of the lens and the optical characteristics is associated with a movable range of the projection region, and perform the control based on the acquired correspondence information and the combination of the identifier of the lens included in the optical system and the optical characteristics in the optical system.

(9) The projection apparatus according to (3) or (8), in which the movable range of the projection region is a range determined in accordance with blocking of projection light by the projection apparatus.

(10) The projection apparatus according to any one of (1) to (9), in which the processor is configured to perform a control of moving the projection region in accordance with a change in the optical characteristics.

(11) The projection apparatus according to (10), in which the processor is configured to, in a state where the movement of the projection region is regulated in accordance with the change in the optical characteristics, in a case where the optical characteristics before change are restored by a further change in the optical characteristics, perform a control of restoring the projection region to the projection region before change.

(12) The projection apparatus according to (11), in which the processor is configured to, in a case of moving the projection region in accordance with the change in the optical characteristics, store the projection region before change in a memory, and in a case where the optical characteristics before change are restored by the change in the optical characteristics, perform the control of restoring the projection region to the projection region before change stored in the memory.

(13) The projection apparatus according to any one of (1) to (12), further comprising a shift mechanism that moves the projection region, in which the processor is configured to perform the control of regulating the movement of the projection region by the shift mechanism.

(14) A projection method by a projection apparatus that projects an image by an optical system having variable optical characteristics, the projection method comprising performing, by a processor of the projection apparatus, a control of regulating movement of a projection region to which the image is projected, based on the optical characteristics in the optical system.

(15) The projection method according to (14), in which the processor is configured to perform the control based on information of the optical characteristics and a movable range of the projection region.

(16) The projection method according to (15), in which the processor is configured to, acquire correspondence information in which the optical characteristics are associated with the movable range of the projection region, and perform the control based on the acquired correspondence information and the optical characteristics in the optical system.

(17) The projection method according to any one of (14) to (16), in which the optical characteristics include an angle of view.

(18) The projection method according to any one of (14) to (17), in which the optical characteristics include a projection direction corresponding to rotational movement of at least a part of the optical system.

(19) The projection method according to any one of (14) to (18), in which the optical characteristics include an image circle.

(20) The projection method according to any one of (14) to (19), in which a lens included in the optical system is interchangeable, and the processor is configured to perform the control based on a combination of an identifier of the lens included in the optical system and the optical characteristics in the optical system.

(21) The projection method according to (20), in which the processor is configured to, acquire correspondence information in which the combination of the identifier of the lens and the optical characteristics is associated with a movable range of the projection region, and perform the control based on the acquired correspondence information and the combination of the identifier of the lens included in the optical system and the optical characteristics in the optical system.

(22) The projection method according to (16) or (21), in which the movable range of the projection region is a range determined in accordance with blocking of projection light by the projection apparatus.

(23) The projection method according to any one of (14) to (22), in which the processor is configured to perform a control of moving the projection region in accordance with a change in the optical characteristics.

(24) The projection method according to (23), in which the processor is configured to, in a state where the movement of the projection region is regulated in accordance with the change in the optical characteristics, in a case where the optical characteristics before change are restored by a further change in the optical characteristics, perform a control of restoring the projection region to the projection region before change.

(25) The projection method according to (24), in which the processor is configured to, in a case of moving the projection region in accordance with the change in the optical characteristics, store the projection region before change in a memory, and in a case where the optical characteristics before change are restored by the change in the optical characteristics, perform the control of restoring the projection region to the projection region before change stored in the memory.

(26) The projection method according to any one of (14) to (25), in which the projection apparatus further includes a shift mechanism that moves the projection region, and the processor is configured to perform the control of regulating the movement of the projection region by the shift mechanism.

(27) A control program of a projection apparatus that projects an image by an optical system having variable optical characteristics, the control program causing a computer to execute a process comprising performing a control of regulating movement of a projection region to which the image is projected, based on the optical characteristics in the optical system.

While various embodiments are described above with reference to the drawings, the present invention is not limited to such examples. It is apparent that those skilled in the art may perceive various modification examples or correction examples within the scope disclosed in the claims, and those examples are also understood as falling in the technical scope of the present invention. In addition, any combination of various constituents in the embodiment may be used without departing from the gist of the invention.

The present application is based on Japanese Patent Application (JP2020-028504) filed on Feb. 21, 2020, the content of which is incorporated in the present application by reference.

EXPLANATION OF REFERENCES

1: projection portion
2: operation reception portion
2A, 3A: hollow portion
2a, 2b, 3a, 3c, 15a: opening
4: control device
4a: storage medium
6: screen
10: projection apparatus
11: projection region
12: light modulation unit
15: housing
21: light source
22: light modulation portion
23: projection optical system
24: control circuit
31: second optical system
32, 122: reflective member
33: third optical system
34: lens
51: optical axis
52: image circle
80: shift range
81, 82, 91 to 94: state
101: body part
102: first member
103: second member
104: projection direction changing mechanism
105: shift mechanism
106: optical unit
111 to 116: correspondence information
121: first optical system
G1: image

What is claimed is:

1. A projection apparatus that projects an image by an optical system having at least one optical characteristic being variable, the projection apparatus comprising:
    a processor configured to perform a control of regulating a movement of a projection region to which the image is projected, based on the at least one optical characteristic in the optical system, wherein the optical system comprises at least one of: a zoom lens having a variable angle of view as the at least one optical characteristic; and a projection optical system in which a projection direction as the at least one optical characteristic is variable by a rotational movement of at least a part of the projection optical system, and the movement of the projection region is a movement based on a user operation or a movement based on projection information of an object onto which the image is to be projected.

2. The projection apparatus according to claim 1, wherein the processor is configured to perform the control based on information of the at least one optical characteristic and a movable range of the projection region.

3. The projection apparatus according to claim 2, wherein the processor is configured to
acquire correspondence information in which the at least one optical characteristic is associated with the movable range of the projection region, and
perform the control based on the acquired correspondence information and the at least one optical characteristic in the optical system.

4. The projection apparatus according to claim 3, wherein the movable range of the projection region is a range determined in accordance with blocking of projection light by the projection apparatus.

5. The projection apparatus according to claim 1, wherein the at least one optical characteristic includes an angle of view.

6. The projection apparatus according to claim 1, wherein the at least one optical characteristic includes a projection direction corresponding to a rotational movement of at least a part of the optical system.

7. The projection apparatus according to claim 1, wherein the at least one optical characteristic includes an image circle.

8. The projection apparatus according to claim 1, wherein a lens included in the optical system is interchangeable, and
the processor is configured to perform the control based on a combination of an identifier of the lens included in the optical system and the at least one optical characteristic in the optical system.

9. The projection apparatus according to claim 8, wherein the processor is configured to
acquire correspondence information in which the combination of the identifier of the lens and the at least one optical characteristic is associated with a movable range of the projection region, and
perform the control based on the acquired correspondence information and the combination of the identifier of the lens included in the optical system and the at least one optical characteristic in the optical system.

10. The projection apparatus according to claim 1, wherein the processor is configured to perform a control of moving the projection region in accordance with a change in the at least one optical characteristic.

11. The projection apparatus according to claim 10, wherein the processor is configured to, in a state where the movement of the projection region is regulated in accordance with the change in the at least one optical characteristic, in a case where the at least one optical characteristic before the change is restored by a further change in the at least one optical characteristic, perform a control of restoring the projection region to the projection region before the change.

12. The projection apparatus according to claim 11, wherein the processor is configured to,
in a case of moving the projection region in accordance with the change in the at least one optical characteristic, store the projection region before the change in a memory, and
in a case where the at least one optical characteristic before the change is restored by the change in the at least one optical characteristic, perform a control of restoring the projection region to the projection region before the change stored in the memory.

13. The projection apparatus according to claim 1, further comprising:
a shift mechanism that moves the projection region,
wherein the processor is configured to perform the control of regulating the movement of the projection region by the shift mechanism.

14. A projection method by a projection apparatus that projects an image by an optical system having at least one optical characteristic being variable, the projection method comprising:
performing, by a processor of the projection apparatus, a control of regulating a movement of a projection region to which the image is projected, based on the at least one optical characteristic in the optical system
wherein the optical system comprises at least one of: a zoom lens having a variable angle of view as the at least one optical characteristic; and a projection optical system in which a projection direction as the at least one optical characteristic is variable by a rotational movement of at least a part of the projection optical system, and
the movement of the projection region is a movement based on a user operation or a movement based on projection information of an object onto which the image is to be projected.

15. A non-transitory computer readable medium storing a control program of a projection apparatus that projects an image by an optical system having at least one optical characteristic being variable, the control program causing a computer to execute a process comprising:
performing a control of regulating a movement of a projection region to which the image is projected, based on the at least one optical characteristic in the optical system,
wherein the optical system comprises at least one of: a zoom lens having a variable angle of view as the at least one optical characteristic; and a projection optical system in which a projection direction as the at least one optical characteristic is variable by a rotational movement of at least a part of the projection optical system, and
the movement of the projection region is a movement based on a user operation or a movement based on projection information of an object onto which the image is to be projected.

* * * * *